(12) United States Patent
Dallman

(10) Patent No.: US 10,426,082 B1
(45) Date of Patent: Oct. 1, 2019

(54) ROTARY CUTTER SYSTEMS AND METHODS

(71) Applicant: Jimmie J Dallman, Stanwood, WA (US)

(72) Inventor: Jimmie J Dallman, Stanwood, WA (US)

(73) Assignee: Rodney G. Long, North Lakewood, WA (US)

( * ) Notice: Subject to any disclaimer, the term of this patent is extended or adjusted under 35 U.S.C. 154(b) by 0 days.

(21) Appl. No.: 15/622,914

(22) Filed: Jun. 14, 2017

Related U.S. Application Data

(60) Provisional application No. 62/350,540, filed on Jun. 15, 2016.

(51) Int. Cl.
*A01D 34/73* (2006.01)
*A01D 101/00* (2006.01)
*A01D 34/64* (2006.01)

(52) U.S. Cl.
CPC ............ *A01D 34/733* (2013.01); *A01D 34/64* (2013.01); *A01D 2101/00* (2013.01)

(58) Field of Classification Search
CPC .... A01D 34/73; A01D 34/733; A01D 34/736; A01D 34/81
See application file for complete search history.

(56) References Cited

U.S. PATENT DOCUMENTS

| | | | | |
|---|---|---|---|---|
| 3,112,599 A * | 12/1963 | Brewer, Jr. | ........... | A01D 34/733 411/176 |
| 3,203,161 A * | 8/1965 | Breisch | ................... | A01D 34/63 56/295 |
| 3,755,999 A * | 9/1973 | Meyer | .................. | A01D 34/736 56/295 |
| 4,922,698 A * | 5/1990 | Taylor | ................... | A01D 34/733 56/17.5 |
| 5,438,819 A * | 8/1995 | Dallman | ................. | A01D 34/73 56/17.5 |
| 5,862,598 A * | 1/1999 | Lee | ..................... | A01D 34/4168 30/276 |
| 2003/0196332 A1* | 10/2003 | Harris | ................... | A01D 34/733 30/276 |
| 2009/0191024 A1* | 7/2009 | Neudorf | ............... | A01D 34/733 411/508 |

(Continued)

FOREIGN PATENT DOCUMENTS

EP          0328988 A1 * 8/1989 ........... A01D 34/733

*Primary Examiner* — Alicia Torres
(74) *Attorney, Agent, or Firm* — Michael R. Schacht; Schacht Law Office, Inc.

(57) ABSTRACT

A cutter assembly has a crossbar, at least one cutter blade, and at least one blade pin. The crossbar defines at least one pin protector recess, at least one bar opening, and at least one bar key surface. The at least one cutter blade defines at least one blade ring, at least one blade edge, a blade bolt opening, and at least one blade recess. The at least one blade pin defines a head portion and at least one bolt key surface. The at least one pin protector recess receives the at least one blade ring. The at least one blade pin is inserted through the blade bolt opening and the at least one bar opening such that the head portion is within the at least one blade recess and the bolt key surface engages the at least one bar key surface.

11 Claims, 9 Drawing Sheets

(56) References Cited

U.S. PATENT DOCUMENTS

| | | | | |
|---|---|---|---|---|
| 2010/0043376 A1* | 2/2010 | Tapper | ............... | A01D 34/733 |
| | | | | 56/289 |
| 2011/0314681 A1* | 12/2011 | Yamaoka | ............ | A01D 34/733 |
| | | | | 30/347 |
| 2012/0047752 A1* | 3/2012 | Hofmann | ............ | A01D 34/733 |
| | | | | 30/275.4 |

* cited by examiner

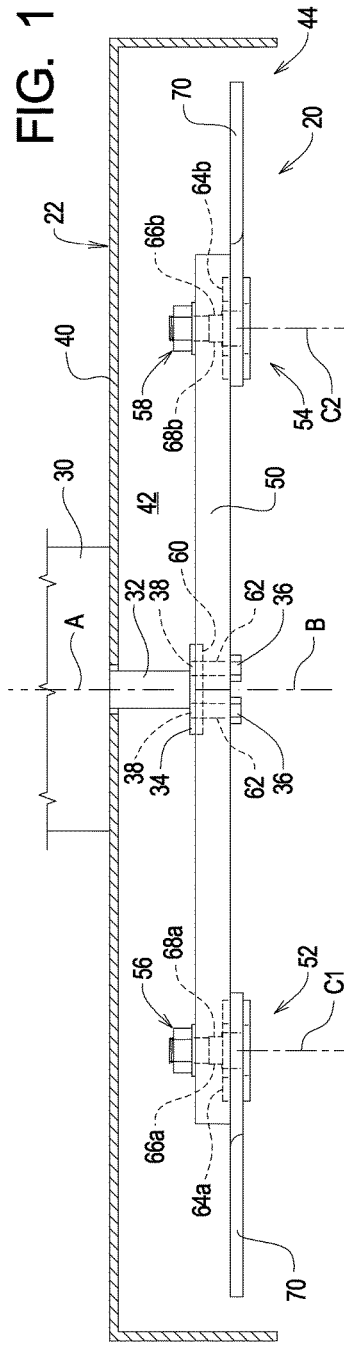
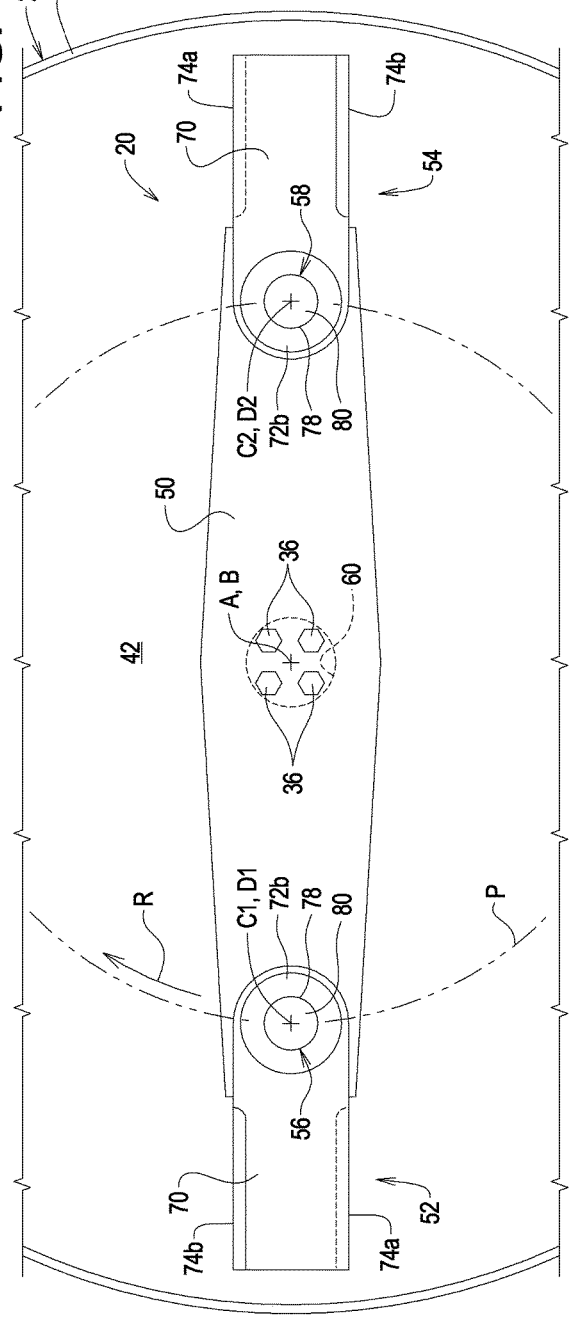

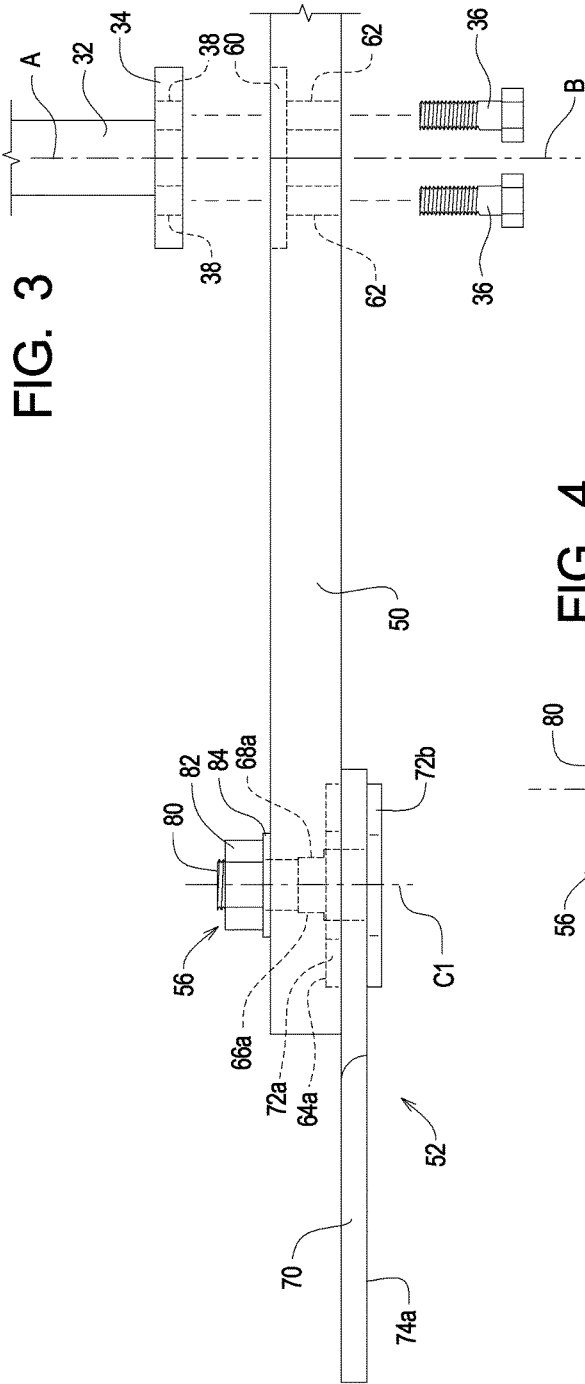
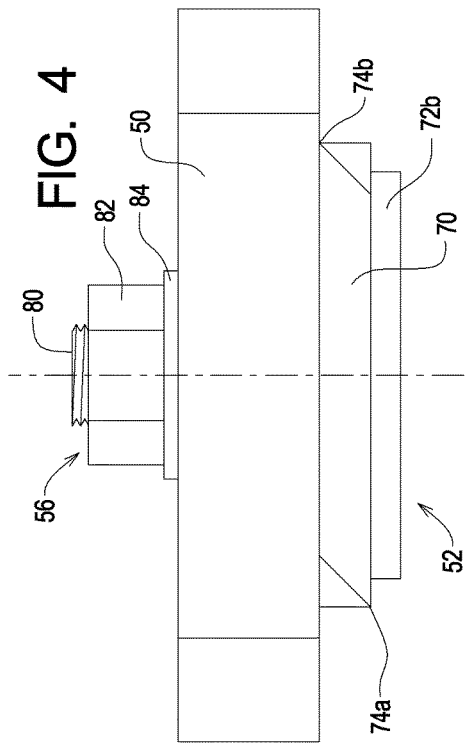

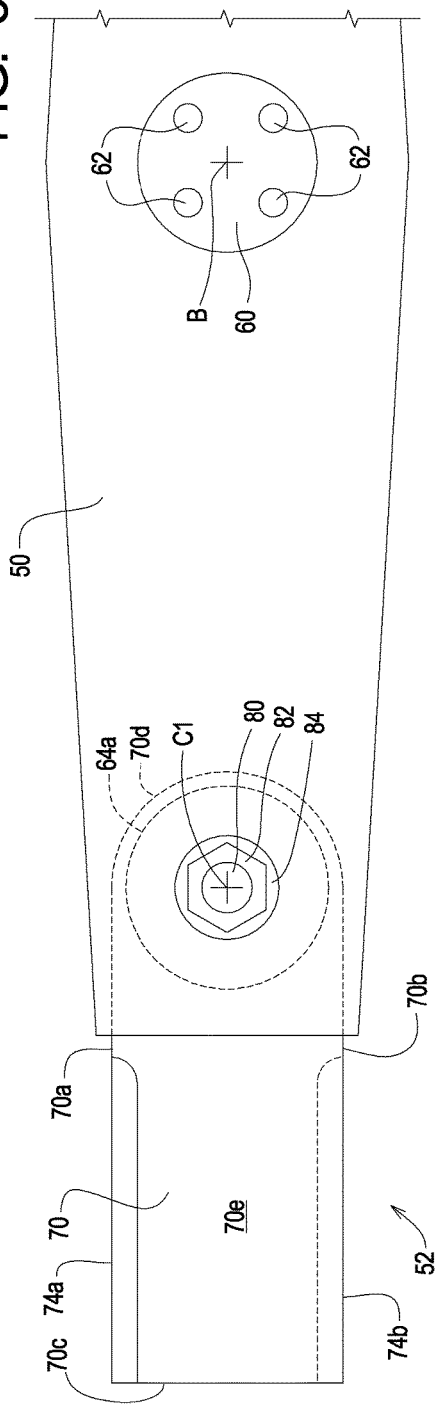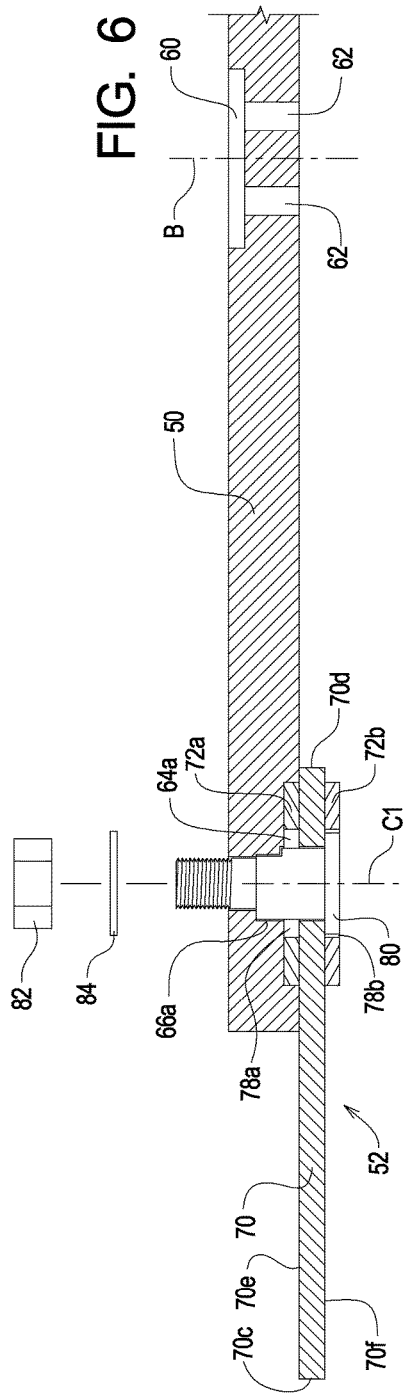

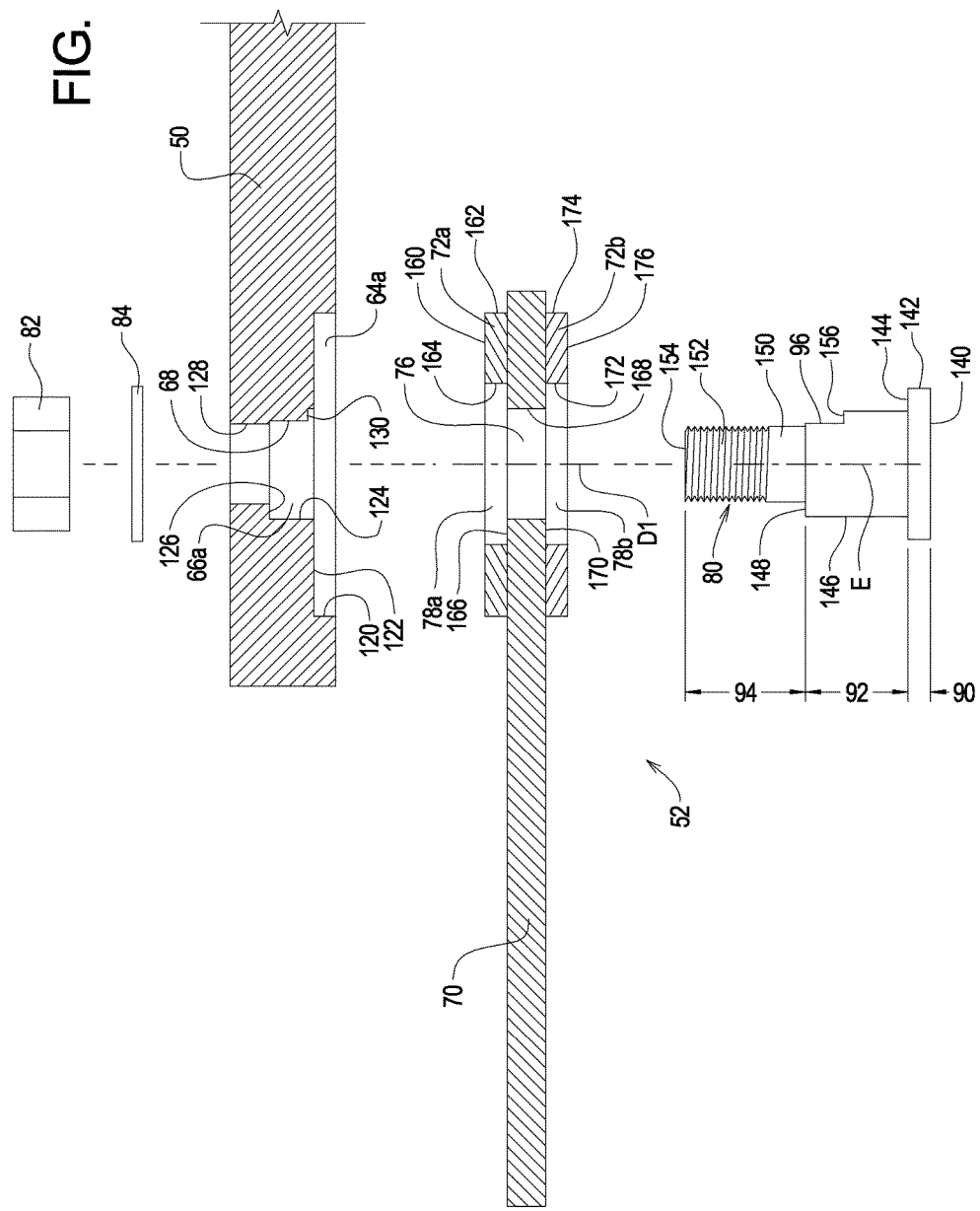

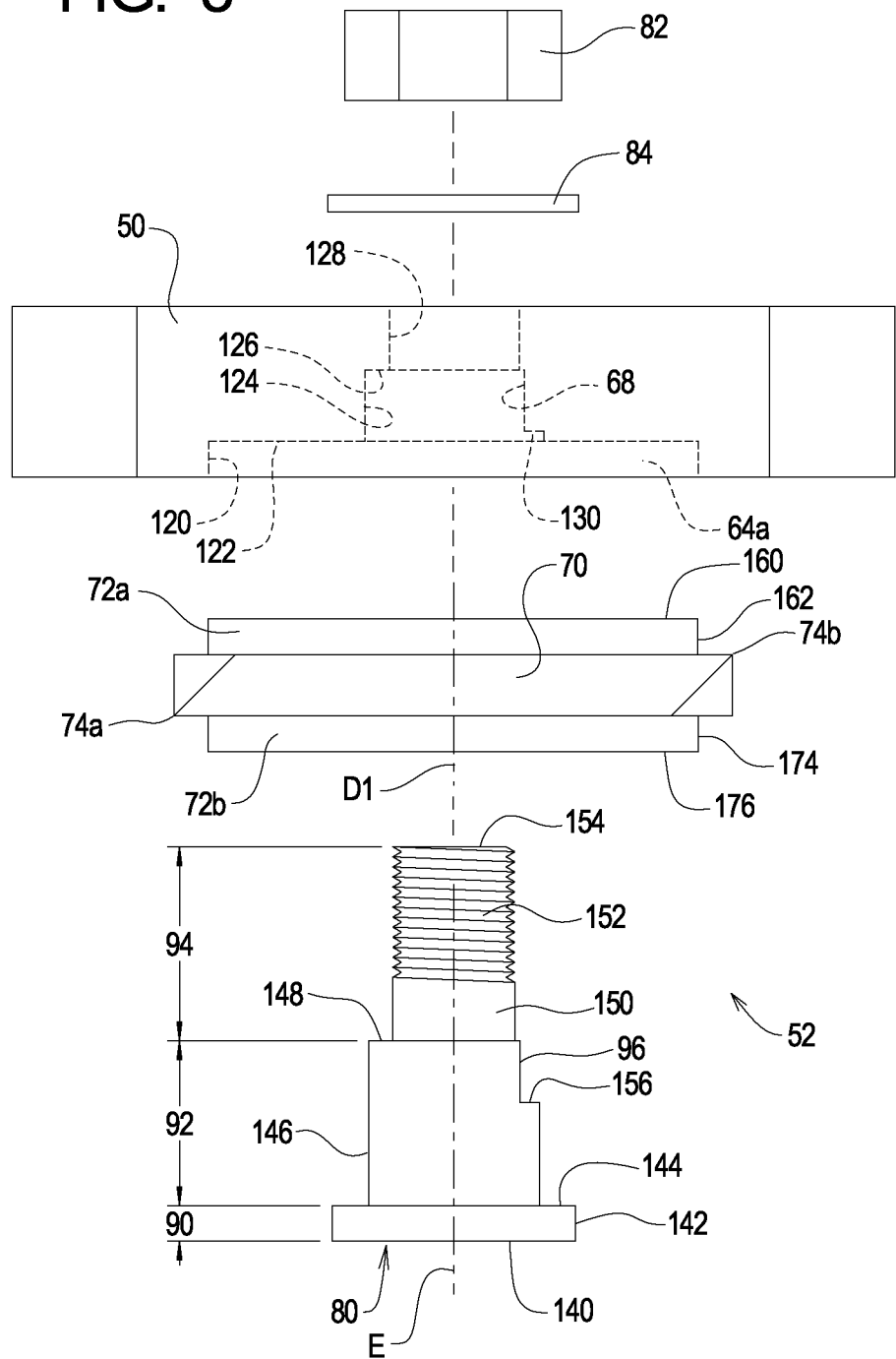

ROTARY CUTTER SYSTEMS AND METHODS

RELATED APPLICATIONS

This application, U.S. patent application Ser. No. 15/622,914 filed Jun. 14, 2017 claims benefit of U.S. Provisional Application Ser. No. 62/350,540 filed Jun. 15, 2016, the contents of which are incorporated herein by reference.

TECHNICAL FIELD

The present invention relates to rotary brush cutter systems and methods and, in particular, to rotary cutter systems and methods with cutting blades pivotably connected to a crossbar.

BACKGROUND

Rotary brush cutters are commonly used to cut dense vegetation, or brush. A rotary brush cutter typically comprises a cutter assembly comprising a crossbar and a pair of cutter blades pivotably attached to the crossbar. When the rotary brush cutter is in use, the crossbar is rotated about a bar axis such that centripetal force causes the blades to extend radially outwardly from the bar axis. Should the cutter blade contact an obstruction made of solid material, such as rock, pipe, pavement, a large tree trunk, or the like, the resistance of the obstruction will cause the cutter blade to pivot relative to the crossbar to allow the cutter blade to clear the solid material.

The cutter assembly of a rotary brush cutter is thus rotated at high speed near the ground and other obstructions. The hardware (e.g., nuts and bolts) that rotatably attach the cutter blades to the crossbar commonly engage the ground and other obstructions. Further, the cutter blades define blade edges that wear down (become less sharp) during use.

The need thus exists for cutter assemblies for rotary brush cutters that minimize damage to the cutter assembly during use. The need also exists for cutter assemblies that may be reconfigured to prolong use of the cutter blade during use.

SUMMARY

The present invention may be embodied as a cutter assembly comprising a crossbar, at least one cutter blade, and at least one blade pin. The crossbar defines at least one pin protector recess, at least one bar opening, and at least one bar key surface. The at least one cutter blade defines at least one blade ring, at least one blade edge, a blade bolt opening, and at least one blade recess. The at least one blade pin defines a head portion and at least one bolt key surface. The at least one pin protector recess receives the at least one blade ring. The at least one blade pin is inserted through the blade bolt opening and the at least one bar opening such that the head portion is within the at least one blade recess and the bolt key surface engages the at least one bar key surface to prevent rotation of the at least one blade pin relative to the crossbar.

The present invention may be embodied as a method of forming a cutter assembly comprising the following steps. A crossbar defining at least one pin protector recess, at least one bar opening, and at least one bar key surface is provided. At least one cutter blade defining at least one blade ring, at least one blade edge, a blade bolt opening, and at least one blade recess is provided. At least one blade pin defining a head portion and at least one bolt key surface is provided. The at least one blade ring is arranged such that the at least one pin protector recess receives the at least one blade ring. The at least one blade pin is inserted through the blade bolt opening and the at least one bar opening such that the head portion is within the at least one blade recess and the bolt key surface engages the at least one bar key surface to prevent rotation of the at least one blade pin relative to the crossbar.

The present invention may also be embodied as a cutter assembly comprising a crossbar, first and second cutter blades, and first and second blade pins. The crossbar defines first and second pin protector recesses, first and second bar opening, and first and second bar key surfaces. The first and second cutter blades each define at least one blade ring, first and second blade edges, a blade bolt opening, and first and second blade recesses. The first and second blade pins each define a head portion and at least one bolt key surface. The first pin protector recess receives the at least one blade ring of the first cutter blade. The first blade pin is inserted through the first blade bolt opening and the first bar opening such that the head portion of the first blade pin is within the at least one blade recess of the first cutter blade and the bolt key surface of the first blade pin engages the first bar key surface to prevent rotation of the first blade pin relative to the crossbar. The second pin protector recess receives the at least one blade ring of the second cutter blade. The second blade pin is inserted through the second blade bolt opening and the second bar opening such that the head portion of the second blade pin is within the at least one blade recess of the second cutter blade and the bolt key surface of the second blade pin engages the second bar key surface to prevent rotation of the second blade pin relative to the crossbar.

BRIEF DESCRIPTION OF THE DRAWINGS

FIG. 1 is a side elevation partial section view of a first example rotary cutter assembly of the present invention and also depicting a portion of an example support system for supporting and rotating the cutter assembly.

FIG. 2 is a bottom plan view depicting the first example rotary cutter assembly and a portion of the example support system;

FIG. 3 is a side elevation partial cutaway view illustrating one example of connecting the first example rotary cutter assembly to the example support system;

FIG. 4 is an end view of the first example rotary cutter assembly with two unused cutting edges;

FIG. 5 is a top plan view of a portion of the first example rotary cutter assembly;

FIG. 6 is a side elevation partial cutaway view of a portion of the first example rotary cutter assembly;

FIG. 7 is an exploded side, partial section view illustrating a first example connecting system for connecting a first cutter head assembly to a first example crossbar to form part of the first example rotary cutter assembly;

FIG. 8 is an exploded end, partial section view illustrating the first example connecting system for connecting the first cutter head assembly to the first example crossbar to form part of the first example rotary cutter assembly;

DETAILED DESCRIPTION

Figure 9:
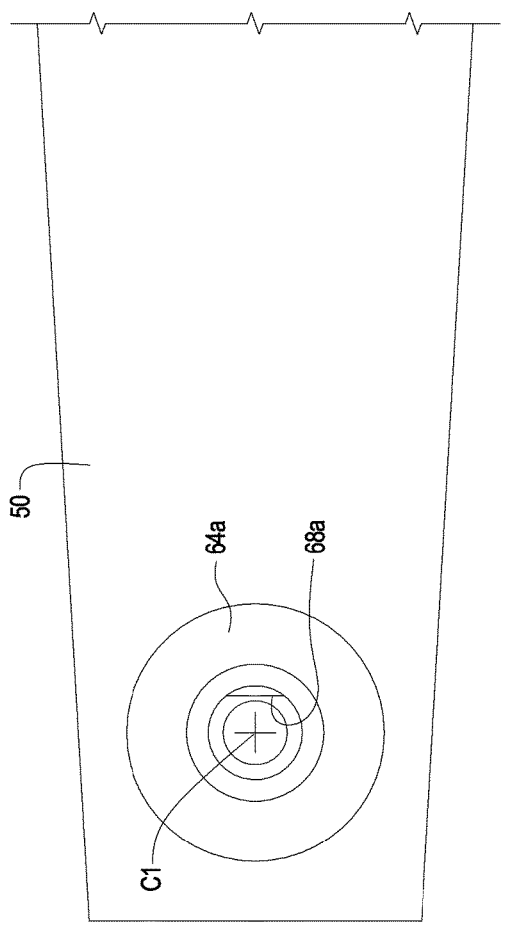
FIG. 9 is a bottom plan view of the first example crossbar of the first example rotary cutter assembly illustrating a first pin protector recess and first bar opening.

Referring initially to FIGS. 1 and 2 of the drawing, depicted therein is a first example rotary cutter assembly 20 constructed in accordance with, and embodying, the principles of the present invention. The first example rotary cutter system 20 is supported by an example cutter deck or shroud 22. The example cutter deck or shroud 22 is or may be conventional and will be described herein only to that extent helpful to a complete understanding of the present invention.

The example cutter deck or shroud 22 comprises a drive housing 30 and a drive shaft 32. The example drive shaft 32 defines a drive axis A and terminates in a drive flange 34. Drive bolts 36 are inserted through flange openings 38 in the drive flange 34 to secure the first example rotary cutter system 20 to the example cutter deck or shroud 22 as will be described in further detail below. The example cutter deck or shroud 22 further comprises a cutter housing 40 secured to the drive housing 30. The cutter housing 40 defines a cutter chamber 42, and access to the cutter chamber 42 is through a bar opening 44.

As is conventional, the example cutter deck or shroud 22 is supported by a movable arm (not shown) from a tractor or other vehicle (not shown). For example, the drive housing 30 may contain a motor (not shown) operatively connected to the drive shaft 32 or may contain a gear box (not shown) operatively connected to the drive shaft 32, the gear box being operatively connected to a motor (not shown) supported by the vehicle. In any event, the drive shaft 32 is axially rotated about the drive axis A. The cutter housing 40 substantially surrounds the example rotary cutter assembly 20 to limit access to the rotating rotary cutter assembly 20. However, the arm is capable of repositioning the drive housing 30 and cutter housing 40 to arrange the bar opening 44 such that the rotating rotary cutter assembly 20 comes into contact with plant material (not shown) to be cut.

As shown in FIGS. 1 and 2, the first example rotary cutter assembly 20 comprises a crossbar 50 defining a bar axis B and first and second cutter axes C1 and C2, first and second cutter head assemblies 52 and 54, and first and second blade pin assemblies 56 and 58. The crossbar 50 defines a drive recess 60, a plurality of drive bolt openings 62, first and second pin protector recesses 64a and 64b, and first and second bar openings 66a and 66b. The example bar axis B extends through the drive recess 60, while the first and second cutter axes C1 and C2 extend through the first and second bar openings 66a and 66b, respectively. The example crossbar 50 is wider adjacent to the bar axis B and tapers towards each of the first and second cutter axes C1 and C2 as perhaps best shown in FIG. 2.

Each of the first and second pin protector recesses 64a and 64b defines a key surface, with only a first key surface 68a of the example first pin protector recess 64a visible in FIG. 6-9. In particular, the example first and second cutter head assemblies 52 and 54 cutter are the same, the first and second blade pin assemblies 56 and 58 are the same, and only the example first cutter head assembly 52 and the example first blade pin assembly 56 will be described herein in detail below.

The example first cutter head assembly 52a comprises a cutter blade 70 defining first and second protector structures 72a and 72b, first and second cutter blade edges 74a and 74b, a first blade bolt opening 76, and first and second blade recesses 78a and 78b. The example first cutter blade 70 is a flat metal bar defining first and second side edges 70a and 70b on which the first and second cutter blade edges 74a and 74b are formed, respectively, by grinding or the like. The side edges 70a and 70b extend between a straight distal end 70c and a curved proximal end 70d of the flat metal bar forming the example first cutter blade 70.

Figure 10:
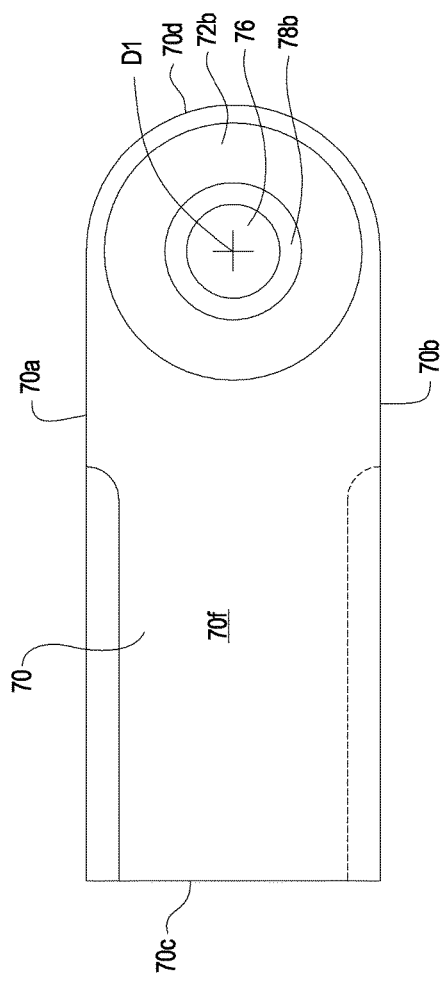
FIG. 10 is a bottom plan view of an example cutter blade of the first example rotary cutter assembly illustrating a first protector structure, blade bolt opening, and first blade recess.
Figure 11:
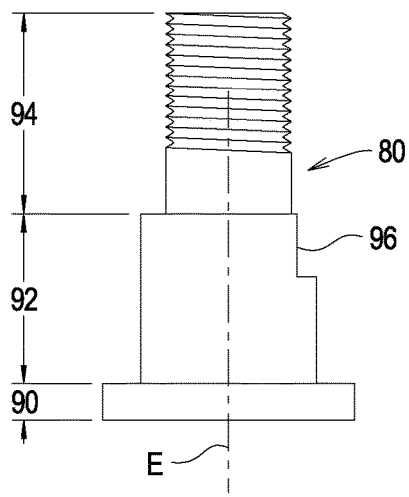
FIG. 11 is a front elevation view of a first example blade pin of the first example rotary cutter assembly.
Figure 12:
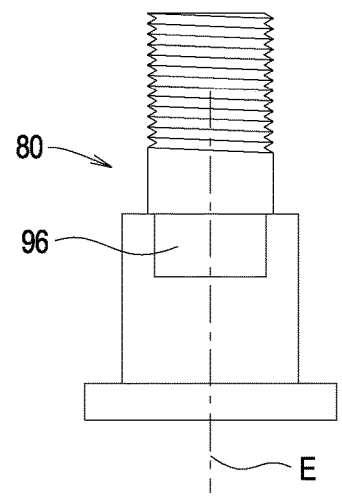
FIG. 12 is a side elevation view of the first example blade pin of the first example rotary cutter assembly.
Figure 13:
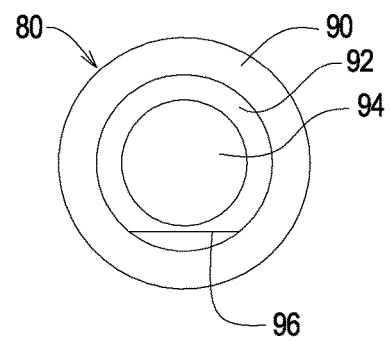
FIG. 13 is a top plan view of the first example blade pin of the first example rotary cutter assembly.
Figure 14:
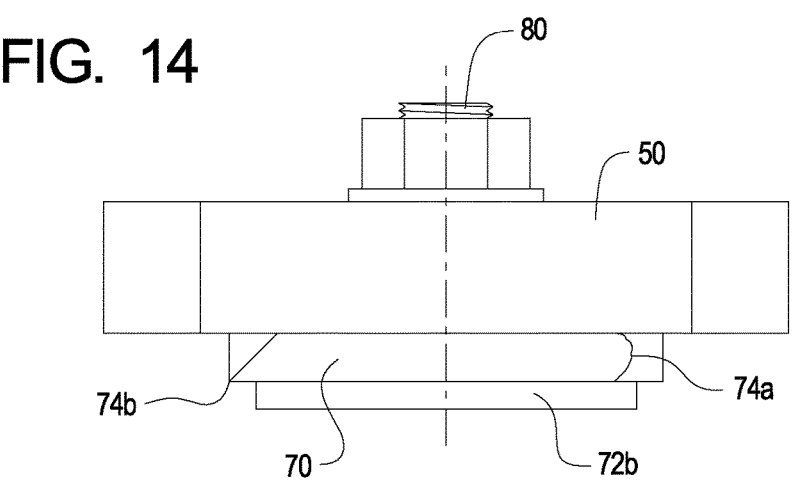
FIG. 14 is an end view of the first example rotary cutter assembly with an unused sharp cutting edge and a used cutting edge, with the used cutting edge in the cutting orientation.

The example first and second protector structures 72a and 72a are rings that are integrally formed with or attached to (e.g., by welding) first and second faces 70e and 70f of the flat metal bar forming the example first cutter blade 70 to form the blade recesses 78a and 78b. The example first blade bolt opening 76 extends between the first and second faces 70e and 70f, is coaxially aligned with openings defined by the first and second protector structures 72a and 72b, and is centered relative to the radius of curvature of the proximal end 70d of the flat metal bar forming the example first cutter blade 70. The example first and second pin protector recesses 78a and 78b are defined by the first and second faces 70e and 70f and the first and second protector structures 72a and 72b, respectively. The first blade bolt opening 76 and the first and second blade recesses 78a and 78b are cylindrical and aligned along a common blade axis D1 as perhaps best shown in FIG. 10.

As shown in FIGS. 1 and 2, the first and second cutter head assemblies 52 and 54 define first and second blade axes D1 and D2, respectively. FIGS. 1 and 2 also show that the first and second blade axes D1 and D2 are aligned with the first and second cutter axes C1 and C2, respectively, when the first example rotary cutter assembly 20 is formed.

FIGS. 7, 8, and 11-13 perhaps best illustrate that the example first blade pin assembly 56 comprise a blade pin 80, a pin nut 82, and a pin washer 84. The example blade pin 80 comprises a head portion 90, a collar portion 92, and an end portion 94. A second key surface 96 is formed on the collar portion 92 of the example blade pin 80. Except for the example second key surface 96, the first blade pin 80 is substantially symmetrical about a bolt axis E.

Although the example protector structures 72a and 72b take the shape of a closed ring, the protector structures 72a and 72b may be formed by a raised structure on the leading edge of the cutter blade 70 of any geometric shape (e.g., rectangular, semispherical) that inhibits contact with the head 90 of the blade pin 80 during rotation of the cutter head assemblies 52 and 54. The protector structures 72a and 72b thus inhibit damage to the blade pins 80 in general and the head portions 90 thereof in particular.

To use the first example cutter assembly 20, the first and second blade pin assemblies 56 and 58 are used to secure the first and second cutter head assemblies 52 and 54 to the crossbar 50, and the drive bolts 36 are used to secure the crossbar 50 to the drive flange 34 and thus the drive shaft 32. So secured, rotation of the drive shaft 32 rotates the crossbar 50 about the drive axis A such that the crossbar 50 and cutter head assemblies 52 and 54 rotate about a circular path P centered about the drive axis A. The example crossbar 50 rotates in a clockwise direction as shown by arrow R in FIG. 2.

To secure the example cutter blades 70 to the crossbar 50 to form the first example cutter assembly 20, the cutter blades 70 are arranged such that the first blade rings 72a are within the first and second pin protector recesses 64a and 64b in the crossbar 50. The first cutter blade edges 74a of the cutter blades 70 are facing in a clockwise direction of rotation R at this point. The first and second blade pin assemblies 56 and 58 are then formed by inserting the blade bolts 80 through the blade bolt openings 76 of the cutter blades 70 and the first and second bar openings 66a and 66b of the crossbar 50, respectively. The pin washers 84 are then arranged over the end portions 94 of the pins 80, and the pin nuts 82 are threaded onto the threaded surfaces of the end portions 94 of the blade pins 80. At this point, the axes C1 and D1 are aligned, and the axes C2 and D2 are aligned, and the cutter blades 70 are capable of rotating relative to the crossbar 50 about the aligned axes C1,D1 and C2,D2. The first and second key surfaces 68 and 96 engage each other to prevent rotation of the blade pins 80 about the aligned axes C1,D1 and C2,D2.

The cutter assembly 20 is then secured to the shroud 22 by arranging the crossbar 50 such that the drive flange 34 is within the drive recess 60 and the drive openings 62 are aligned with the flange openings 38. The drive bolts 36 are then inserted through the aligned drive openings 62 and flange openings 38 to secure the drive flange 34 within the drive recess 60. The drive bolts 36 may be threaded into the flange openings 38 to secure the drive bolts 36 in place within the drive openings 62 and flange openings 38, or separate drive nuts (not shown) may be used to secure the drive bolts 36 in place within the drive openings 62 and flange openings 38. At this point, rotation of the drive flange 34 is transmitted to the crossbar 50 through the drive bolts 36.

When attached to the shroud 22, the cutter assembly 20 is arranged and rotated such that the first cutter edges 74a engage and cut vegetation in the path of rotation. The cutter blades 70 are held by centripetal force in an extended position as shown, for example, in FIGS. 1, 2, and 5. In this extended position, the cutter blades 70 are in line with the crossbar 50 during rotation of the crossbar 50 and thus will cut all vegetation in the path of rotation of the cutter blades 70. However, if the cutter blades 70 engage a hard object, such as a rock, curb, trunk, or stump, the cutter blades 70 will rotate counter clockwise to the crossbar 50 to reduce the likelihood of damage to the crossbar 50 and/or the shroud 22.

Figure 15:
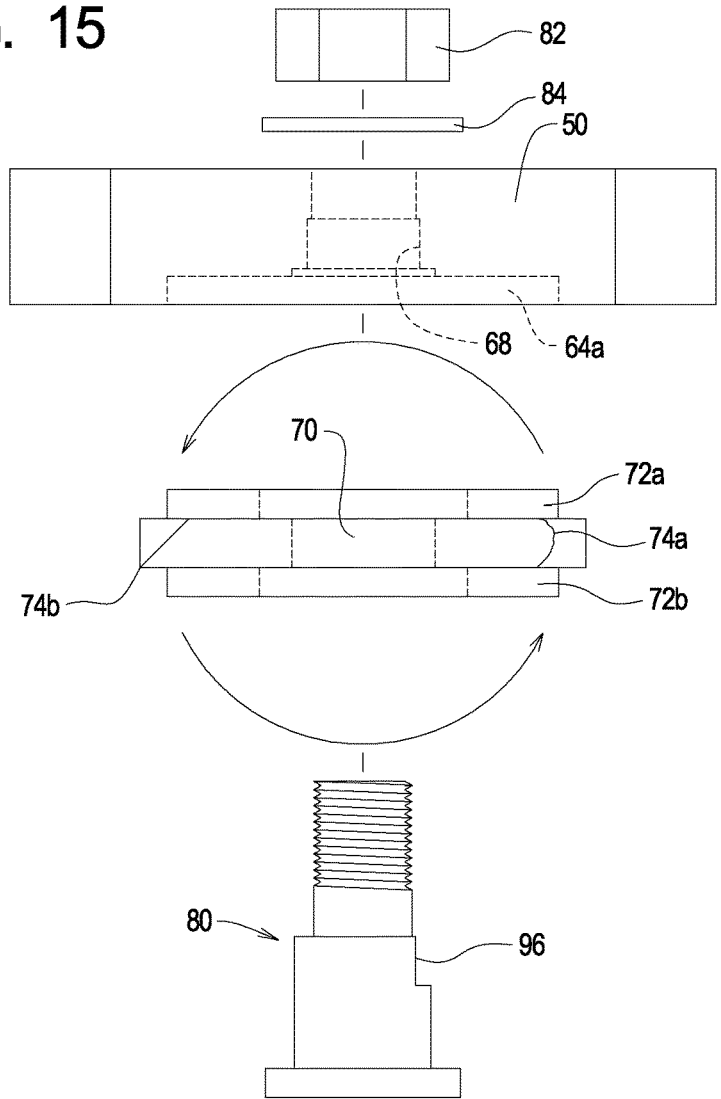
FIG. 15 is an exploded end view of the first example rotary cutter assembly illustrating the process of rotating the cutter blade with an unused cutting edge and a used cutting edge such that the unused cutting edge is in a cutting orientation.
Figure 16:
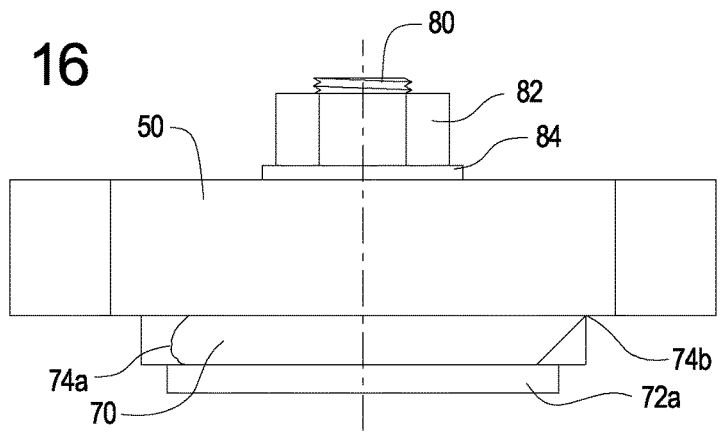
FIG. 16 is an end view of the first example rotary cutter assembly with an unused cutting edge and a used cutting edge, with the unused cutting edge in the cutting orientation.
Figure 17:
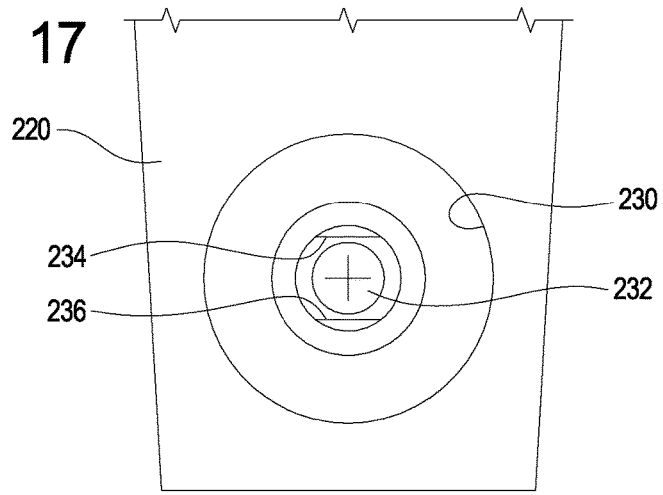
FIG. 17 is a bottom plan view of the second example crossbar of a second example rotary cutter assembly illustrating a first pin protector recess and first bar opening.
Figure 18:
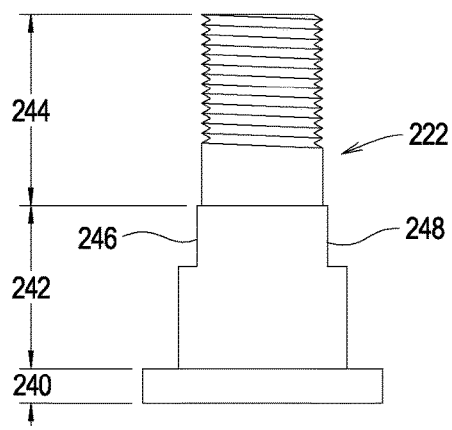
FIG. 18 is a front elevation view of a second example blade pin of the second example rotary cutter assembly.
Figure 19:
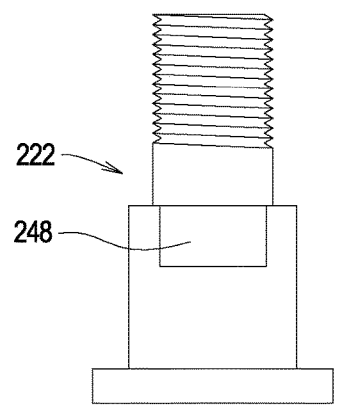
FIG. 19 is a side elevation view of the second example blade pin of the second example rotary cutter assembly.
Figure 20:
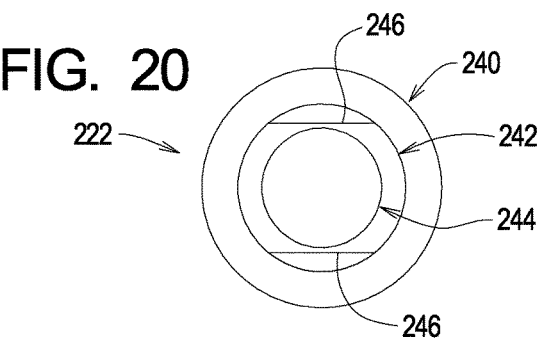
FIG. 20 is a top plan view of the second example blade pin of the first example rotary cutter assembly.

After a period of time, the first cutter edges 74a will become used as shown in FIGS. 15 and 16. At this point, one or both of the cutter blades 70 may be removed and rotated as shown in FIG. 15. At this point, the second blade rings 72b of the cutter blades 70 are within the first and second crossbar pin protector recesses 64a and 64b and the second blade edges 74b face the direction of rotation R. The blade retaining the blade pins 80 are-installed through the cutter blades 70 and crossbar 50 as shown in FIG. 16 with the still unused second cutter edges 74b in the leading position such that rotation of the crossbar in the direction R causes the second cutter edges 74b to engage and cut vegetation within the path of rotation of the cutter blades 70.

Turning now to FIGS. 9-13, the details of the example blade pin 80 and of the engagement of the blade pin 80 with the blade recesses 78a or 78b and of the blade rings 72a or 72b with the first and second pin protector recesses 64a and 64b will now be described in further detail.

As perhaps best shown in FIGS. 7 and 8, the example first blade recess 64a defines a first inner surface 120, a first radial surface 122, a second inner surface 124, a second radial surface 126, a third inner surface 128, and a stop surface 130. The example first and second radial surfaces 122 and 126 are annular. The example first and second inner surfaces 120 and 124 are cylindrical, and the example third inner surface 128 is cylindrical except that the example stop surface 130, which is flat and parallel to the cutter axis C1, extends across a portion of the third inner surface 128.

The example blade pin 80 defines a head surface 140, a head outer surface 142, a head radial surface 144, a collar outer surface 146, a collar radial surface 148, an end spacing surface 150, an end threaded surface 152, an end surface 154, and a second stop surface 156. The example head surface 140 and end surface 154 are substantially circular. The head outer surface 142 and end spacing surface 150 are substantially cylindrical. The collar outer surface 146 is substantially cylindrical except that the second stop surface 156, which is flat and parallel to the bolt axis E, is formed by removing a portion of the collar outer surface 146. The head radial surface 144 and a collar radial surface 148 are annular. The end threaded surface 152 is substantially cylindrical but is threaded to match threading on the pin nut 82.

With the first blade ring 72a and second blade ring 72b secured to or integrally formed with the first and second blade faces 70e and 70f, respectively, the cutter blade 70 defines a first ring radial surface 160, a first ring outer surface 162, a first ring inner surface 164, first blade radial surface 166, a blade inner surface 168, a second blade radial surface 170, a second ring inner surface 172, a second ring outer surface 174, and a second ring radial surface 176. The first ring radial surface 160, first and second blade radial surfaces 166 and 170, and second ring radial surface 176 are all annular. The first and second ring outer surfaces 162 and 174, first and second ring inner surface 164 and 172, and a blade inner surface 168 are cylindrical. All of the surfaces defined by the blade rings 72a and 72b and blade faces 70e and 70f are coaxially aligned with the blade axis D1.

To assemble the cutter blades 70 onto the crossbar 50, the first ring radial surface 160 is arranged to engage the first recess radial surface 122, and the first ring outer surface 162 is arranged such that it is adjacent to the first recess inner surface 120. The blade pins 80 are then inserted such that the bolt head radial surface 144 is in contact with the second blade radial surface 170 and the bolt head outer surface 142 is adjacent to the second ring inner surface 172 as shown in FIGS. 7 and 8.

When the blade pin assemblies 56 and 58 are assembled with the first and second cutter head assemblies 52 and 54, the first and second key surfaces 68a and 68b engage the corresponding key surfaces 96 on the blade pins 80 to prevent axial rotation of the blade pin relative to the crossbar 50. Similarly, the first and second stop surfaces 130 and 156 engage each other when the blade pins 80 are fully inserted into the first and second pin protector recesses 64a and 64b, respectively. The pin washer 84 and pin nut 82 are threaded onto the end threaded surface 152 to secure the blade pins 80 in their fully inserted positions.

This arrangement allows the cutter blades 70 to rotate relative to the crossbar 50 as described above. However, with the key surfaces 68a,b and 96 and the stop surfaces 130 and 156 in contact as shown in FIGS. 7 and 8, the blade pin assemblies 56 and 58 do not rotate relative to the crossbar 50. At this point, the head surface 140 of the head portion 90 of the blade pin 80 is flush or substantially co-planar with the surface 176 defined by the protector structure 72b of the cutter blade 70. The blade pin assemblies 56 and 58 are therefor substantially protected from direct impact during use of the cutter assembly 20.

Turning now to FIGS. 17-20, the details of a second example crossbar 220 and a second example blade pin 222 will now be described. The second example crossbar 220 and second example blade pin 222 are designed to be used with a cutter blade such as the cutter blade 70 described above.

The second example crossbar 220 comprises a drive recess (not visible in FIG. 17), drive openings (not visible in FIG. 17), at least one pin protector recess 230 and at least one bar opening 232. Typically, two pin protector recesses 230 and two bar openings 232 are symmetrically spaced on each end of the crossbar 220, but only one is described and depicted herein for purposes of simplicity. First and second key surfaces 234 and 236 are associated with each pin protector recess 230.

The second example blade pin 222 comprises a head portion 240, a collar portion 242, and an end portion 244. Third and fourth key surfaces 246 and 248 are formed on the collar portion 242.

The second example blade pin 222 is used to secure a cutter blade such as the cutter blade 70 described above to the second example crossbar 220. In particular, when the blade pin 222 is fully inserted into the bar opening 232, the first and second key surfaces 234 and 236 will engage the third and fourth key surfaces 246 and 248 to prevent rotation of the blade pin 222 relative to the crossbar 220 but still allow rotation of the cutter blade relative to the crossbar 220. In other respects, the second example crossbar 220 and the second example blade pin 222 are or may be the same as the crossbar 50 and blade pin 80 described above.

What is claimed is:

1. A cutter assembly comprising:
a crossbar defining first and second pin protector recesses, first and second bar openings, and first and second bar key surfaces;
first and second cutter blades each defining first and second blade rings, first and second blade edges, a blade bolt opening, and first and second blade recesses; and
first and second blade pins each defining a head portion and at least one bolt key surface; wherein
the first pin protector recess is sized and dimensioned to receive the first and second blade rings of the first cutter blade;
the first blade pin is inserted through the blade bolt opening of the first cutter blade and the first bar opening such that
the head portion of the first cutter blade is within one of the first and second blade recesses of the first cutter blade, and
the bolt key surface of the first blade pin engages the first bar key surface to prevent rotation of the first blade pin relative to the crossbar;
the second pin protector recess is sized and dimensioned receive the first and second blade rings of the second cutter blade;
the second blade pin is inserted through the blade bolt opening of the second cutter blade and the second bar opening such that
the head portion of the second cutter blade is within one of the first and second blade recesses of the second cutter blade, and
the bolt key surface of the second blade pin engages the second bar key surface to prevent rotation of the second blade pin relative to the crossbar;
the first cutter blade operates in
a first configuration in which the first blade ring of the first cutter blade is within the first protector recess, the head portion of the first blade pin is within the second blade recess of the first cutter blade, and the first blade edge of the first cutter blade is in a leading position, and
a second configuration in which the second blade ring of the first cutter blade is within the first protector recess, the head portion of the first blade pin is within the first blade recess of the first cutter blade, and the second blade edge of the first cutter blade is in a leading position; and
the second cutter blade operates in
a first configuration in which the first blade ring of the second cutter blade is within the second protector recess, the head portion of the second blade pin is within the second blade recess of the second cutter blade, and the first blade edge of the second cutter blade is in a leading position, and
a second configuration in which the second blade ring of the second cutter blade is within the second protector recess, the head portion of the second blade pin is within the first blade recess of the second cutter blade, and the second blade edge of the second cutter blade is in a leading position.

2. A cutter assembly as recited in claim 1, further comprising first and second pin nuts, where the first and second pin nuts engage the first and second blade pins, respectively, to secure the first and second blade pins relative to the crossbar.

3. A cutter assembly as recited in claim 1, in which:
a portion of each of the first and second cutter blades defines at least one blade surface; and
the head portion of each of the blade pins defines a head surface; wherein
the at least one head surface of the first and second cutter blades are substantially flush with the blade surfaces when the first and second blade pins are inserted through the blade bolt openings in the first and second cutter blades and the first and second bar openings, respectively, in the crossbar.

4. A method of forming a cutter assembly comprising the steps of:
providing a crossbar defining first and second pin protector recesses, first and second bar openings, and first and second bar key surfaces;
providing first and second cutter blades each defining first and second blade rings, first and second blade edges, a blade bolt opening, and first and second blade recesses;
providing first and second blade pins each defining a head portion and at least one bolt key surface;

arranging the at least one blade ring of the first cutter blade such that the first pin protector recess receives the at least one blade ring of the first cutter blade;
inserting the first blade pin through the blade bolt opening of the first cutter blade and the first bar opening such that
the head portion of the first cutter blade is within one of the first and second blade recesses of the first cutter blade, and
the bolt key surface of the first blade pin engages the first bar key surface to prevent rotation of the first blade pin relative to the crossbar;
arranging the at least one blade ring of the second cutter blade such that the second pin protector recess receives the at least one blade ring of the second cutter blade; and
inserting the second blade pin through the blade bolt opening of the second cutter blade and the second bar opening such that
the head portion of the second cutter blade is within one of the first and second blade recesses of the second cutter blade, and
the bolt key surface of the second blade pin engages the second bar key surface to prevent rotation of the second blade pin relative to the crossbar;
operating the first cutter blade in
a first configuration in which the first blade ring of the first cutter blade is within the first protector recess, the head portion of the first blade pin is within the second blade recess of the first cutter blade, and the first blade edge of the first cutter blade is in a leading position, and
a second configuration in which the second blade ring of the first cutter blade is within the first protector recess, the head portion of the first blade pin is within the first blade recess of the first cutter blade, and the second blade edge of the first cutter blade is in a leading position; and
operating the second cutter blade in
a first configuration in which the first blade ring of the second cutter blade is within the second protector recess, the head portion of the second blade pin is within the second blade recess of the second cutter blade, and the first blade edge of the second cutter blade is in a leading position, and
a second configuration in which the second blade ring of the second cutter blade is within the second protector recess, the head portion of the second blade pin is within the first blade recess of the second cutter blade, and the second blade edge of the second cutter blade is in a leading position.

5. A method as recited in claim 4, further comprising the step of arranging first and second pin nuts to engage the first and second blade pins, respectively, to secure the first and second blade pins relative to the crossbar.

6. A method as recited in claim 4, in which:
the step of providing the first and second cutter blades comprises the step of defining at least one blade surface on each of the first and second cutter blades;
the head portion of each of the blade pins defines a head surface; and
the head surfaces are substantially flush with the blade surfaces when the first and second blade pins are inserted through the blade bolt openings in the first and second cutter blades and the first and second bar openings, respectively, in the crossbar.

7. A cutter assembly comprising:
a crossbar defining first and second pin protector recesses, first and second bar openings, and first and second bar key surfaces;
first and second cutter blades; and
first and second blade pins each defining a head portion and at least one bolt key surface; wherein
the first pin protector recess the is sized and dimensioned to receive either of first and second blade rings of the first cutter blade;
the first blade pin is adapted to be inserted through a first blade bolt opening and the first bar opening such that
the head portion of the first blade pin is within either of first and second blade recesses of the first cutter blade, and
the at least one bolt key surface of the first blade pin engages the first bar key surface to prevent rotation of the first blade pin relative to the crossbar;
the second pin protector recess the is sized and dimensioned to receive either of the first and second blade rings of the second cutter blade; and
the second blade pin is adapted to be inserted through a second blade bolt opening and the second bar opening such that
the head portion of the second blade pin is within either of the first and second blade recesses of the second cutter blade, and
the at least one bolt key surface of the second blade pin engages the second bar key surface to prevent rotation of the second blade pin relative to the crossbar
the first cutter blade operates in
a first configuration in which the first blade ring of the first cutter blade is within the first pin protector recess, the head portion of the first blade pin is within the second blade recess of the first cutter blade, and a first blade edge of the first cutter blade is in a leading position, and
a second configuration in which the second blade ring of the first cutter blade is within the second pin protector recess, the head portion of the first blade pin is within the first blade recess of the first cutter blade, and a second blade edge of the first cutter blade is in a leading position; and
the second cutter blade operates in
a first configuration in which the first blade ring of the second cutter blade is within the second pin protector recess, the head portion of the second blade pin is within the second blade recess of the second cutter blade, and the first blade edge of the second cutter blade is in a leading position, and
a second configuration in which the second blade ring of the second cutter blade is within the second pin protector recess, the head portion of the second blade pin is within the first blade recess of the second cutter blade, and the second blade edge of the second cutter blade is in a leading position.

8. A cutter assembly as recited in claim 7, further comprising first and second pin nuts, where the first and second pin nuts engage the first and second blade pins, respectively, to secure the first and second blade pins relative to the crossbar.

9. A cutter assembly as recited in claim 7, in which:
a portion of each of the first and second cutter blades defines a blade surface; and
a head portion of each of the blade pins defines a head surface; wherein
the head surfaces are substantially flush with the blade surfaces when the first and second blade pins are inserted through the blade bolt openings in the first and second cutter blades and the first and second bar openings, respectively, in the crossbar.

10. A cutter assembly comprising:
a crossbar defining at least one pin protector recess, at least one bar opening, and at least one bar key surface;
at least one cutter blade defining first and second blade rings, first and second blade edges, a blade bolt opening, and first and second blade recesses; and
at least one blade pin defining a head portion and at least one bolt key surface; wherein
each pin protector recess is sized and dimensioned to receive either of the first and second blade rings;
the at least one blade pin is adapted to be inserted through the blade bolt opening and the at least one bar opening such that
the head portion is within the at least one blade recess, and
the bolt key surface engages the at least one bar key surface to prevent rotation of the at least one blade pin relative to the crossbar; and
the at least one cutter blade operates in:
a first configuration in which the first blade ring is within the at least one pin protector recess, the head portion of the at least one blade pin is within the second blade recess, and the first blade edge is in a leading position, and
a second configuration in which the second blade ring is within the at least one pin protector recess, the head portion of the at least one blade pin is within the first blade recess, and the second blade edge is in a leading position.

11. A method of forming a cutter assembly comprising the steps of:
providing a crossbar defining at least one pin protector recess, at least one bar opening, and at least one bar key surface;
providing at least one cutter blade defining first and second blade rings, first and second blade edges, a blade bolt opening, and first and second blade recesses, where each pin protector recess is sized and dimensioned to receive either of the first and second blade rings;
providing at least one blade pin defining a head portion and at least one bolt key surface;
inserting the at least one blade pin through the blade bolt opening and the at least one bar opening such that
the head portion is within the at least one blade recess, and
the bolt key surface engages the at least one bar key surface to prevent
rotation of the at least one blade pin relative to the crossbar; and operating the at least one cutter blade in:
a first configuration in which the first blade ring is within the at least one pin protector recess, the head portion of the at least one blade pin is within the second blade recess, and the first blade edge is in a leading position, and
a second configuration in which the second blade ring is within the at least one pin protector recess, the head portion of the at least one blade pin is within the first blade recess, and the second blade edge is in a leading position.

* * * * *